United States Patent
Kiyose et al.

(10) Patent No.: US 8,547,806 B2
(45) Date of Patent: Oct. 1, 2013

(54) OPTICAL DISC APPARATUS AND RECORDING METHOD

(75) Inventors: Yoshihiro Kiyose, Tokyo (JP); Tomo Kishigami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 545 days.

(21) Appl. No.: 12/989,297

(22) PCT Filed: Jan. 26, 2009

(86) PCT No.: PCT/JP2009/051184
§ 371 (c)(1), (2), (4) Date: Oct. 22, 2010

(87) PCT Pub. No.: WO2009/130925
PCT Pub. Date: Oct. 29, 2009

(65) Prior Publication Data
US 2011/0038239 A1    Feb. 17, 2011

(30) Foreign Application Priority Data

Apr. 23, 2008   (JP) .................... 2008-112266

(51) Int. Cl.
*G11B 7/085*   (2006.01)
(52) U.S. Cl.
USPC ................................................... 369/30.21
(58) Field of Classification Search
None
See application file for complete search history.

(56) References Cited

U.S. PATENT DOCUMENTS

| | | | | |
|---|---|---|---|---|
| 7,486,602 | B2 * | 2/2009 | Raaymakers | 369/53.34 |
| 7,535,808 | B2 * | 5/2009 | Ishimoto et al. | 369/53.22 |
| 2004/0145977 | A1 | 7/2004 | Sakai et al. | |
| 2008/0112286 | A1 | 5/2008 | Sakai | |
| 2009/0059747 | A1 * | 3/2009 | Nakano et al. | 369/47.15 |
| 2009/0274024 | A1 * | 11/2009 | Nakano et al. | 369/47.5 |
| 2011/0034343 | A1 * | 2/2011 | Erling et al. | 506/7 |

FOREIGN PATENT DOCUMENTS

| | | |
|---|---|---|
| JP | 2003-263764 A | 9/2003 |
| JP | 2004-55103 A | 2/2004 |
| JP | 2004-234703 A | 8/2004 |
| JP | 2005-18888 A | 1/2005 |
| JP | 2005-174387 A | 6/2005 |
| JP | 2005-251343 A | 9/2005 |
| JP | 2007-59005 A | 3/2007 |
| JP | 2007-310992 A | 11/2007 |
| JP | 2008-123647 A | 5/2008 |

* cited by examiner

*Primary Examiner* — Joseph Feild
*Assistant Examiner* — Parul Gupta
(74) *Attorney, Agent, or Firm* — Birch, Stewart, Kolasch & Birch, LLP

(57) ABSTRACT

A recorded area is reproduced during a suspension of a recording operation; when degradation of the recorded signal is detected (S4, S5) by the signal quality detection means (16), a tilt adjustment is performed in the recorded area, the signal quality of the recorded signal is detected after the tilt adjustment (S6), and if it is still degraded, a recording parameter is altered (step S7). The need to obtain tilt adjustment values for tilt corrections at a plurality of radial positions in advance is eliminated, resulting in reduced apparatus overhead and better recording quality.

28 Claims, 11 Drawing Sheets

REPRODUCED
SIGNAL
$\beta < 0$

REPRODUCED
SIGNAL
$\beta = 0$

REPRODUCED
SIGNAL
$\beta > 0$

OPTICAL DISC APPARATUS AND RECORDING METHOD

FIELD OF THE INVENTION

The present invention relates to an optical disc apparatus and method for recording and reproduction on an optical disc, and more particularly to a method and apparatus for tilt adjustment during recording.

BACKGROUND ART

An optical disc apparatus has a structure in which accurate data recording and reproduction are enabled by the performance of focus error correction control to focus on the information layer, tracking control to prevent deviation from information tracks formed in the information recording layer of the optical disc, and tilt control to control the optical axis of the laser beam output from the objective lens so that it is perpendicular to the surface of the recording medium.

At present, various types of optical discs have been developed, including the DVD (digital versatile disc) and BD (Blu-ray disc) for use in TV program recording and reproduction and PC applications. The shorter laser beam wavelengths and larger NA used to obtain higher densities increase the effect of comatic aberration, demanding more precise tilt control.

As one proposed answer to this demand, in tilt control of an optical disc inserted into an optical disc apparatus, a tilt adjustment is performed at a radial position midway between the inner circumference position and the outer circumference position (see, for example, patent document 1). Another proposal is to perform tilt adjustments at a plurality of radial positions, and perform corrections with estimated tilt values obtained from an approximation formula calculated from the adjustment values (see, for example, patent document 2).

Patent document 1: Japanese Patent Application Publication No. 2003-263764 (page 5, FIG. 2)

Patent document 2: Japanese Patent Application Publication No. 2004-055103 (page 17, FIG. 10)

DISCLOSURE OF THE INVENTION

Problems to be Solved by the Invention

A problem in optical disc apparatus equipped with a tilt adjustment means for correcting the angle between the optical axis of the laser beam output from the objective lens and the recording medium surface so as not to depart from the perpendicular due to warpage of the disc, however, has been that accurate tilt adjustment in relation to the warpage of the optical disc has not been possible.

When tilt adjustments are made in advance at a plurality of radial positions on an optical disc by using a tilt sensor in order to calculate an approximation formula for estimating a tilt correction value, one problem has been that much overhead is required and another problem has been that an additional tilt sensor circuit is required.

Means of Solution of the Problems

An optical disc apparatus according to the present invention includes:

an optical head for emitting a laser beam for recording and reproducing, receiving reflected light due to reflection of the laser beam from a recording medium surface of an optical disc, and outputting an electrical signal corresponding to the received light;

a signal amplifying means for amplifying the signal, derived from the reflected light, from the optical head and outputting a servo error signal and a reproduced signal;

a focus control means for performing a focusing point search operation by moving a focusing means of the optical head in a direction substantially perpendicular to the recording medium surface of the optical disc until the laser beam is focused on the recording medium surface of the optical disc, and keeping the focusing means in the focused state;

a tilt control means for performing an adjustment to make the laser beam focused by the focusing means perpendicular to the recording medium surface of the optical disc;

a signal quality detection means for detecting a signal quality of the reproduced signal output from the signal amplifying means;

a modulating/demodulating means for performing modulation and demodulation according to a modulation rule used on the recording medium surface of the optical disc;

an interface means for performing data communication with a host controller;

a buffer memory for temporarily holding recording data supplied from the controller via the interface means; and a control means for reproducing a recorded area during a suspension of a recording operation, and when degradation of the recorded signal is detected by the signal quality detection means, performing a tilt adjustment on the recorded area by use of the tilt control means and detecting a signal quality of the recorded signal after the tilt adjustment by use of the signal quality detection means.

Effect of the Invention

According to the present invention, it is not necessary to obtain tilt adjustment values at a plurality of radial positions in advance in order to perform tilt corrections, and because recording is carried out with changes made in a recording parameter while tilt adjustments are performed in free time during which recording is suspended to detect the recording quality, the overhead of the optical disc apparatus, particularly of the control means, is reduced and recording quality is improved.

Figure 1:
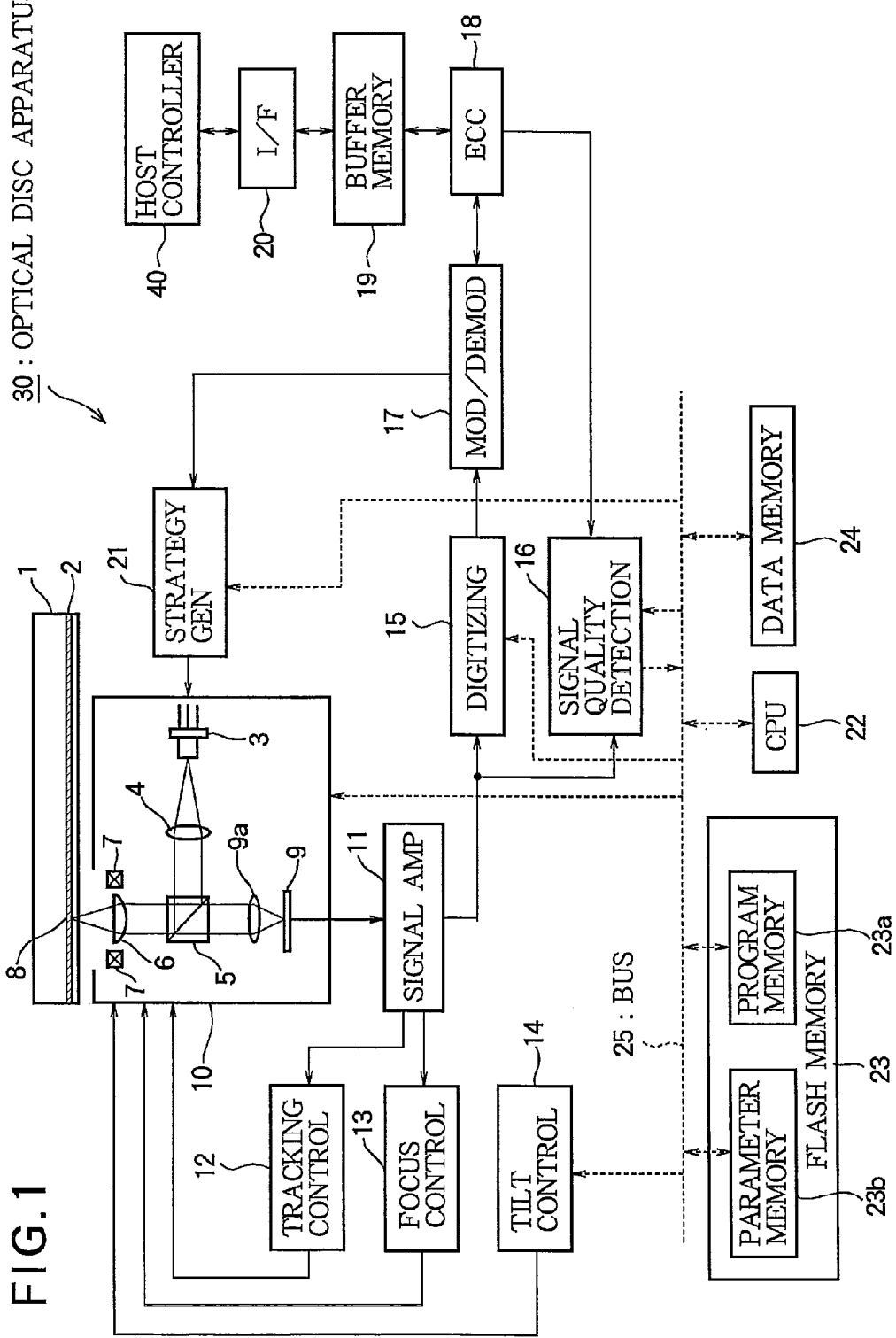
FIG. 1 illustrates an optical disc apparatus in a first embodiment of the invention.

EXPLANATION OF REFERENCE CHARACTERS 1 optical disc, 2 recording medium surface, 3 laser diode, 4 collimator lens, 5 prism, 6 objective lens, 7 objective lens actuator, 8 laser spot, 9a sensor lens, 9 photodetector, 10 optical head, 11 signal amplifying circuit, 12 tracking control circuit, 13 focus control circuit, 14 tilt control circuit, 15 digitizing circuit, 16 signal quality detection circuit, 17 modulating/demodulating circuit, 18 error correcting circuit, 19 buffer memory, 20 interface circuit, 21 write strategy generating circuit, 22 CPU, 23a program memory, 23b parameter memory, 24 data memory, 30 optical disc apparatus, 40 host controller.

BEST MODE FOR CARRYING OUT THE INVENTION

First Embodiment

Embodiments of the invention will now be described with reference to the drawings.

The inventive optical disc apparatus detects the signal quality of a recorded signal; when it decides that degradation of recording quality has occurred, it performs a tilt adjustment and detects the signal quality of the resultant recorded signal, and if it detects that the quality of the recorded signal is still degraded, it alters a recording parameter.

FIG. 1 is a block diagram showing the structure of an optical disc apparatus 30 according to the invention together with a host controller 40. The illustrated optical disc apparatus 30 uses a spindle motor (not shown) to turn an optical disc 1, and uses an optical head 10 to perform recording and reproduction. The data to be recorded are supplied from the host controller 40; the reproduced data are supplied to the host controller 40. It will be assumed below that the optical disc apparatus cannot halt the supply of data from the host controller 40 to the buffer memory 19.

The optical head 10 emits a laser beam for recording and reproducing, receives light reflected from a recording medium surface (information recording surface) 2 of the optical disc 1, outputs an electrical signal corresponding to the received light, and includes a laser diode (semiconductor laser source) 3 for generating a laser beam, for example, a blue laser beam, a collimator lens 4, a prism 5, an objective lens 6 for focusing the laser beam on the recording medium surface 2 of the optical disc 1, an objective lens actuator 7 for positioning a laser spot 8 (focusing the laser beam) on the recording medium surface 2 of the optical disc 1, a sensor lens 9a for focusing the light reflected from the recording medium surface 2 of the optical disc 1 that returns via the objective lens 6, and a photodetector 9 for detecting the light reflected from the recording medium surface 2 of the optical disc 1.

A signal amplifying circuit (AMP) 11 amplifies the signal from the optical head 10 and outputs a servo error signal and a reproduced signal.

A focus control circuit 13 performs a focusing point search operation by moving the laser spot 8 in a direction perpendicular to the recording medium surface 2 of the optical disc 1 and keeps the laser spot 8 in the focused state on the recording medium surface 2 of the optical disc 1.

A tilt control circuit 14 performs a tilt-angle adjustment to make the optical axis of the laser beam output from the optical head 10 perpendicular to the recording medium surface 2 of the optical disc 1.

A tracking control circuit 12 controls positioning of the laser spot 8 in a radial direction of the optical disc 1.

A digitizing circuit 15 converts the reproduced signal output from the signal amplifying circuit 11 to a digital signal.

A modulating/demodulating circuit (MOD/DEMOD) 17 performs modulation and demodulation according to a modulation rule used on the recording medium surface 2 of the optical disc 1.

An error correcting circuit (ECC) 18 performs encoding and decoding by an error correcting system used on the optical disc 1.

An interface circuit (I/F) 20 performs data communication with the host controller 40.

The buffer memory 19 temporarily holds reproduced data to be supplied to the host controller 40 via the interface circuit 20 and recording data supplied from the controller via the interface circuit 20.

During reproducing, the reproduced signal from the signal amplifying circuit 11 is converted to a digital signal in the digitizing circuit 15, and is demodulated in a demodulating block of the modulating/demodulating circuit 17 according to the modulation rule of the optical disc 1. The demodulated data are decoded (error-corrected) in the error correcting circuit 18, and the decoded data are temporarily held (saved) in the buffer memory 19 and sent to the host controller 40 via the interface circuit 20 as reproduced data.

During recording, the recording data from the host controller 40 are temporarily saved in the buffer memory 19 via the interface circuit 20, then encoded in the error correcting circuit 18 (with the addition of an error correcting code) and modulated in the modulating/demodulating circuit 17.

The strategy generating circuit (GEN) 21 sets a write strategy corresponding to an ID in the unique information that the disc manufacturer prerecords in, for example, the lead-in area of the optical disc 1, drives the laser diode 3 with a recording write strategy corresponding to the data modulated in the modulating/demodulating circuit 17, and forms recording marks on the recording medium surface 2 of the optical disc 1.

The buffer memory 19 is provided in order to absorb differences between the data transfer rates of the host controller 40 and the optical disc apparatus. When, for example, a TV broadcast is recorded on a consumer DVD recorder, data may be constantly transferred at a maximum rate of 10.08 Mbps from the host controller 40. The optical disc apparatus, however, has a plurality of transfer rates including the 2× rate of 22.16 Mbps, twice the rate in the DVD specification, and the 8× rate of 88.64 Mbps, which is intended for dubbing. A 16-Mbit SDRAM is often used as the buffer memory.

The signal quality detection circuit 16 detects the signal quality of the reproduced signal output from the signal amplifying circuit 11 during reproducing of the recording medium surface 2 of the optical disc 1. As the signal quality, the signal quality detection circuit 16 determines the jitter value and signal amplitude of the reproduced signal. The signal quality detection circuit 16 also determines the asymmetry and modulation depth of the reproduced signal for use in recording power adjustment, which is necessary during recording.

The error correcting circuit 18 calculates an error rate from the number of errors detected and corrected during decoding.

The jitter value or signal amplitude of the reproduced signal obtained in the signal quality detection circuit 16, or the error rate, is also used for tilt adjustment, in which the tilt control circuit 14 sets a tilt angle that gives a minimum jitter value, a maximum signal amplitude, or a minimum error rate.

Figure 2:
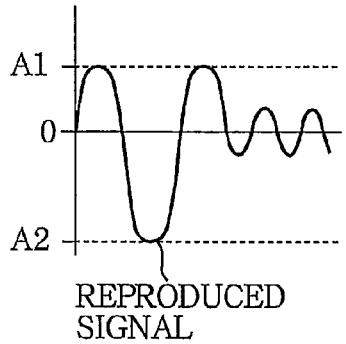
FIGS. 2(a) to 2(c) illustrate signal waveforms used to determine the asymmetry value of an optical disc.
Figure 2:
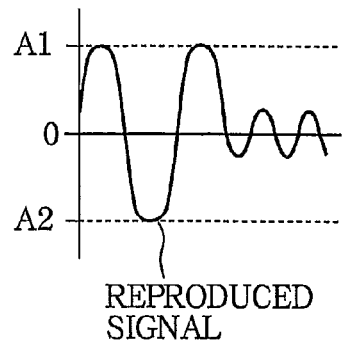
Figure 2:
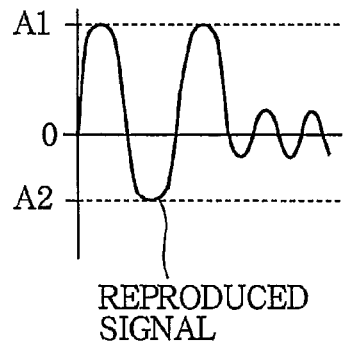

When determining the asymmetry, the signal quality detection circuit 16 couples the received signal by an AC (alternating current) coupling, and calculates an asymmetry value $\beta$ based on the AC-coupled signal. FIGS. 2(*a*) to 2(*c*) show examples of the AC-coupled electrical signal. The vertical axis indicates reproduced signal level, and the horizontal axis indicates time. The signal quality detection circuit 16 detects the peak level A1 and bottom level A2 of the exemplary signals shown in FIGS. 2(*a*) to (*c*). The signal quality detection circuit 16 calculates the asymmetry value $\beta$ from the detected peak level A1 and bottom level A2 by using the following equation (1).

$$\beta = (A1+A2)/(A1-A2) \tag{1}$$

The peak level A1 and bottom level A2 occur where spaces of maximum length alternate with marks of maximum length; these values are referenced to a zero level given by the average of the peak level and bottom level where spaces of minimum length alternate with marks of minimum length.

In the exemplary asymmetry values of the reproduced signal detected in the signal quality detection circuit 16 shown in FIGS. 2(*a*) to 2(*c*), FIG. 2(*a*) illustrates the case in which the asymmetry value $\beta$ is less than zero ($\beta<0$), FIG. 2(*b*) illustrates the case in which the asymmetry value $\beta$ is equal to zero ($\beta=0$), and FIG. 2(*c*) illustrates the case in which the asymmetry value $\beta$ is greater than zero ($\beta>0$).

In determining the modulation depth, the signal quality detection circuit 16 detects the peak level PK and bottom level BT of the received signal. Differing from the asymmetry determination, the signal quality detection circuit 16 detects the peak level PK and bottom level BT of the signal obtained directly (by DC coupling), without performing AC coupling, and calculates the modulation depth therefrom by using the following equation (2).

$$\text{Modulation depth} = (PK-BT)/PK \tag{2}$$

Figure 3:
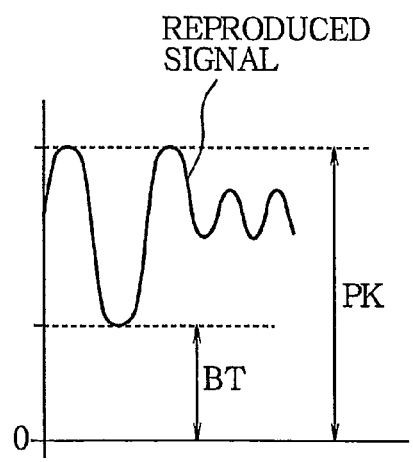
FIG. 3 illustrates a signal waveform used to determine the modulation depth of an optical disc.

An exemplary signal obtained by performing DC coupling is shown in FIG. 3. The vertical axis indicates reproduced signal level, and the horizontal axis indicates time. The peak PK and bottom BT are referenced to the zero level (the output when no reflected light is received from the optical disc 1), as shown. The peak PK and bottom BT correspond to the levels of a space of maximum length and a mark of maximum length, respectively.

The asymmetry value generally increases with increasing recording power and decreases with decreasing recording power. The asymmetry value is frequently used to optimize the recording power on write-once optical recording media; the modulation depth is frequently used on rewritable discs. The modulation depth also generally increases with increasing recording power, and decreases with decreasing recording power.

Because the optical disc apparatus holds a target asymmetry value and a modulation depth, corresponding to the ID in the unique information on the optical disc, that optimize the recording quality, the optical disc apparatus may carry out recording with a plurality of recording power settings on a power calibration area of the optical disc 1 when recording starts, and set the recording power corresponding to the asymmetry value detected in the signal quality detection circuit 16 that is the closest to the target asymmetry value in the optical head 10 as an optimum recording power. The asymmetry value is generally used on write-once discs (DVD-R etc.) as noted above. On rewritable discs (DVD-RW etc.), the modulation depth is frequently used instead of the asymmetry value.

After the optimum recording power is determined in the power calibration area of the optical disc 1, if the optical disc apparatus 30 continues recording at, for example, the 2× rate equal to twice the rate in the DVD specification and the capacity of the buffer memory 19 is 16 Mbits, then due to the difference in data transfer rates between the optical disc apparatus 30 and the host controller 40, the optical disc apparatus 30 records all the data that the host controller 40 can store in the buffer memory 19 (filling it to its full capacity) on the optical disc 1 in 1.38 seconds (buffer memory empty), suspends recording, and then has substantially 1.66 seconds of free time until the buffer memory 19 becomes full. The present invention uses this free time to perform, for example, a quality check of a recorded area, such as an area recorded just before recording was suspended.

Recording on the optical disc is not necessarily performed by starting when the buffer memory 19 becomes full and continuing until the buffer memory 19 becomes empty as described above; alternatively, recording may be performed by repeating a process of checking that at least a predetermined amount (first amount) of data is stored in the buffer memory 19, starting recording on the optical disc 1, reading one or more units of data from the buffer memory 19, each unit including a certain amount (second amount) of data, writing the data onto the optical disc 1, and then suspending recording. The quality check then starts during the suspension of reading, and recording resumes after the quality check ends. The buffer memory 19 must not become full before the quality check ends. Therefore, free space in the buffer memory 19 is monitored before the start of the quality check, and the quality check starts only if the quality check can be expected to end before the buffer memory 19 becomes full.

Figure 4:
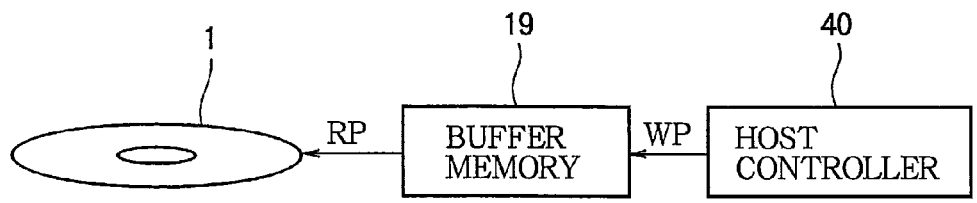
FIG. 4 schematically illustrates the data flow in the process of writing data onto the optical disc 1 via the buffer memory 19 from the host controller 40.

FIG. 4 is a schematic diagram illustrating the data flow in the process of writing data onto the optical disc 1 via the buffer memory 19 from the host controller 40. As above, it will be assumed that the optical disc apparatus cannot halt the supply of data from the host controller 40 to the buffer memory 19.

The address (write pointer) WP at which data writing onto the buffer memory 19 from the host controller 40 is performed moves during writing, and the address (read pointer) RP at which reading is performed moves during reading, and halts during a suspension of reading. The full state of the buffer memory 19 is the state in which the read pointer RP is halted and the write pointer WP has overtaken the read pointer RP; if reading (recording on the optical disc 1) does not start, data that have not yet been read from the buffer memory 19 will be overwritten, so data to be recorded on the optical disc 1 will be lost.

The empty state of the buffer memory 19 is the state in which the read pointer RP has overtaken the write pointer WP; if reading (recording on the optical disc 1) continues, data that have already been recorded on the optical disc 1 will be read and recorded again on the optical disc 1.

As described above, data corruption occurs when either one of the write pointer WP and read pointer RP overtakes the other.

Data recording on the optical disc is performed in predetermined units. Recording is performed on, for example, a Blu-Ray disc by taking one 64-kbyte cluster as the minimum unit. Therefore, a difference equal to or greater than the minimum unit of recording on the optical disc has to be maintained between the write pointer WP and read pointer RP. The full state and empty state described above are states in which there is a difference of at least this minimum unit, so these states are more precisely a near-full state and a near-empty state.

When the optical disc apparatus performs CLV (constant linear velocity) control of the spindle motor, at the outer circumference of the optical disc, the free time described above corresponds to a time for 30 revolutions, so a block fitting within one revolution can be checked 30 times. The number of checks performed may be selected according to the processing overhead time of the optical disc apparatus and the capacity of the buffer memory 19 that is used.

The setting of the recording power in the optical head 10, the setting of the write strategy information in the strategy generating circuit 21, the acquisition of information (asymmetry value, modulation depth, jitter value, signal amplitude, error rate) from the signal quality detection circuit 16, the setting of the tilt angle in the tilt control circuit 14, and the series of operations described above are controlled by a CPU 22, and programs are stored in a program memory 23a.

Information on the write strategy, target asymmetry value, and target modulation depth corresponding to the ID in the unique information of the optical disc is also stored in a parameter memory 23b configured from flash memory or the like. The parameter memory 23b and the program memory 23a may be configured as different areas in the same flash memory 23. The CPU 22 is connected to the program memory 23a, the parameter memory 23b, a data memory 24 described below, the optical head 10, the tilt control circuit 14, the digitizing circuit 15, and the signal quality detection circuit 16 by a bus 25.

Figure 5:
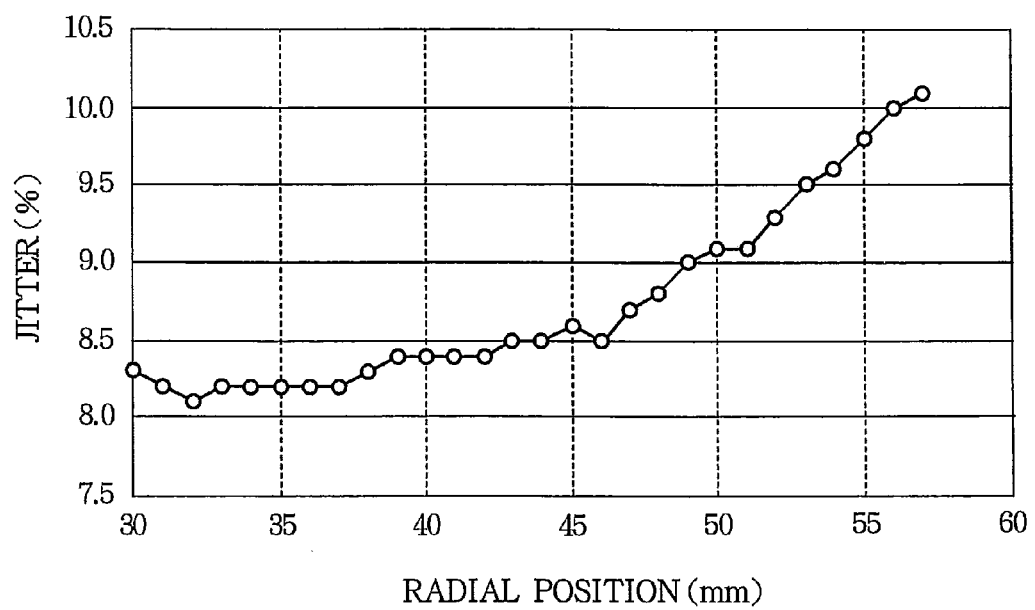
FIG. 5 illustrates jitter characteristics measured with a fixed tilt adjustment made at the inner circumference of the optical disc.

FIG. 5 illustrates a jitter characteristic obtained with the optical disc apparatus by using a type of DVD-R disc to perform a tilt adjustment at the inner circumference and then recording on the entire disc surface at that tilt angle. Although the jitter value was in the lower half of the eight percents (from 8.0% to 8.5%) at the inner circumference where the tilt adjustment was performed, signal quality degradation appeared as the outer circumference was approached, and the jitter value exceeded 10% at the outer circumference. This shows that the optimum tilt angle differs depending on the radial position.

Figure 6:
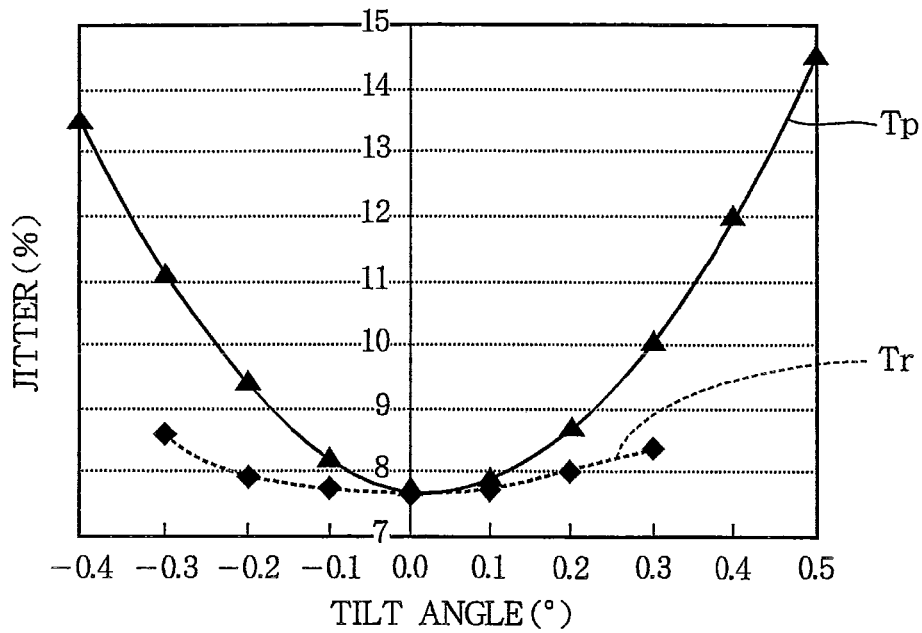
FIG. 6 is a graph showing the relationships between jitter and the recording and reproducing tilt angles of the optical disc.

FIG. 6 illustrates jitter characteristics obtained by recording at a varying recording tilt angle and then reproducing at an optimum reproducing tilt angle (the dotted curve denoted Tr) and by recording an area at the optimum recording tilt angle and reproducing the area with a varying reproducing tilt angle (the solid curve denoted Tp). The horizontal axis in FIG. 6 indicates the recording tilt angle for curve Tr, and the reproducing tilt angle for curve Tp. FIG. 6 shows that the reproducing tilt has a greater effect than the recording tilt on the jitter value. Therefore, if the jitter value is used as an adjustment guideline (if the adjustment is performed using the jitter value as an index representing tilt), the reproducing tilt angle can be adjusted easily. The jitter value is correlated with the error rate and signal amplitude; at small jitter values (good signal quality) the error rate is low and the signal amplitude is high.

Figure 7:
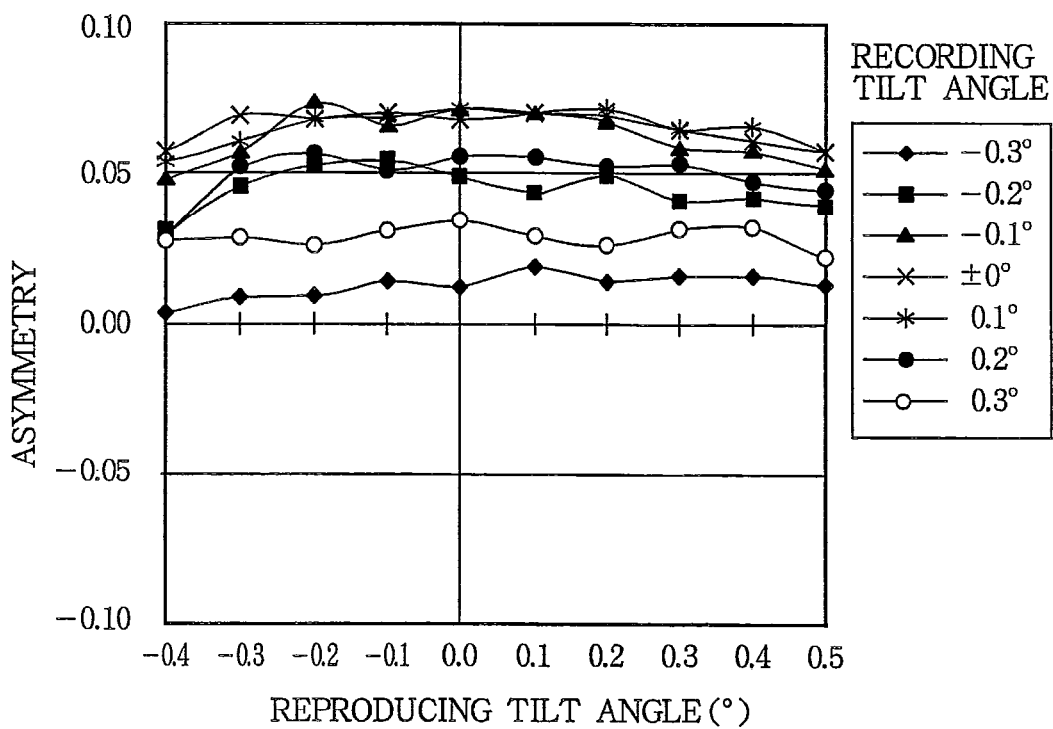
FIG. 7 is a graph showing the relationship between recording tilt angle and the asymmetry value.

FIG. 7 shows asymmetry characteristics obtained by varying the reproducing tilt angle, using the recording tilt angle as a parameter. The reproducing tilt has comparatively little effect on asymmetry, but if the recording tilt angle departs from the optimum value (±0°), the asymmetry value decreases. Therefore, recording tilt deviation is easily distinguished by the asymmetry value. More specifically, if the asymmetry value is used as an adjustment guideline (the adjustment is performed using the asymmetry value as an index representing tilt), the recording tilt angle can be adjusted easily.

Figure 8:
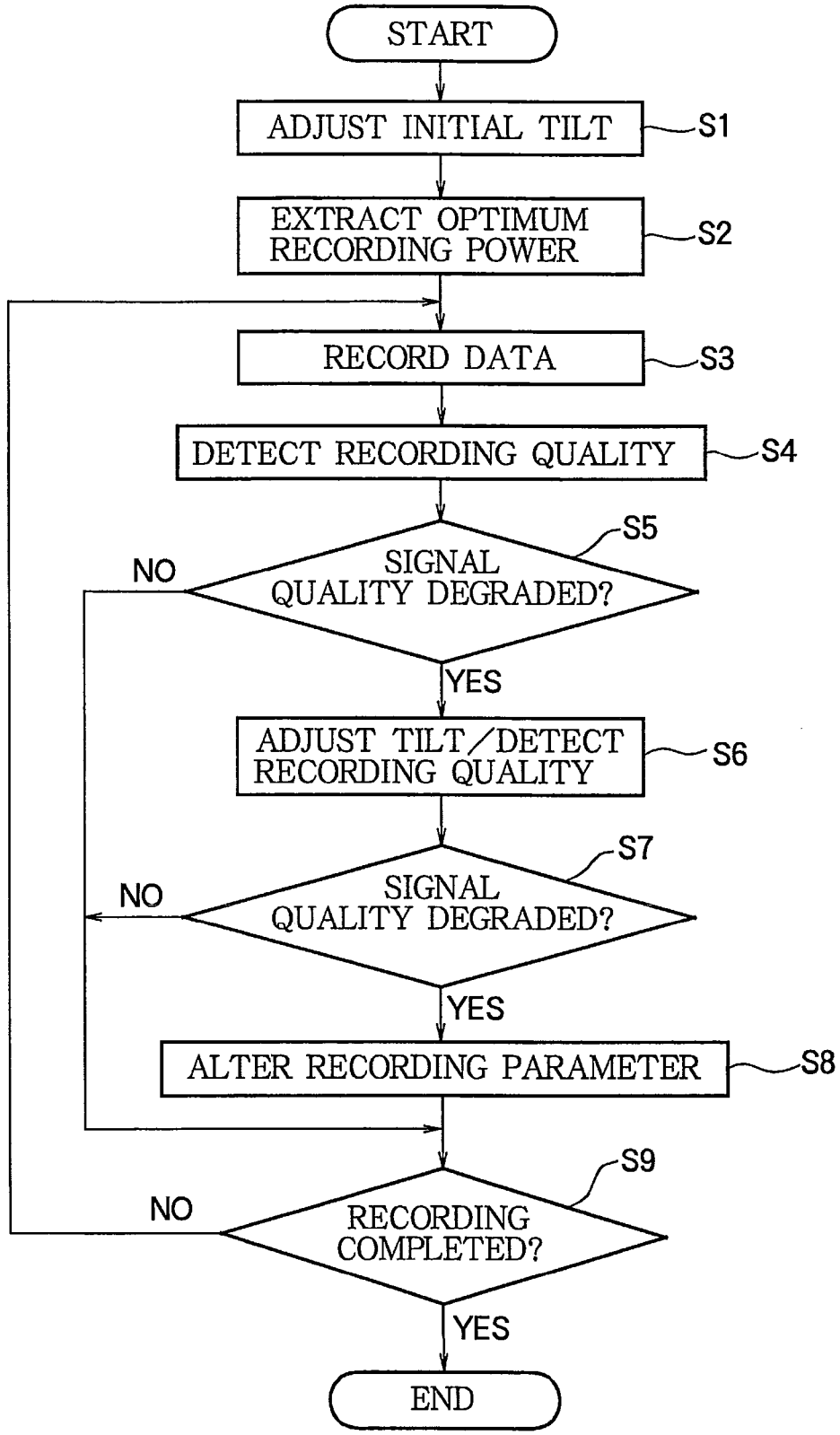
FIG. 8 is a flowchart illustrating an exemplary recording procedure in the first embodiment of the invention.

FIG. 8 is a flowchart illustrating an exemplary recording procedure in the first embodiment of the invention.

When a command to start recording is issued from the host controller 40, a tilt adjustment is performed at the recording start position (S1). The tilt adjustment is performed by the tilt control circuit 14 under the control of the CPU 22.

When the optical disc 1 is an unused blank disc, the tilt angle is set for maximum signal amplitude in the embossed area on the control tracks at the inner circumference position; when the optical disc 1 is not a blank disc, the tilt angle is set for maximum signal amplitude in a recorded area. If tilt angle information about the recorded area is retained as described below, the retained value may be set.

At the start of recording, the optimum recording power is determined in the power calibration area (S2), and data are recorded (S3). The CPU 22 determines the recording power, and the optical head 10 performs recording with the recording power determined by the CPU 22. The data recording is performed by the modulating/demodulating circuit 17 and the strategy generating circuit 21 under the control of the CPU 22. During recording, tracking control and focus control are also performed by the tracking control circuit 12 and the focus control circuit 13, based on the output from the signal amplifying circuit 11.

Next, a predetermined amount of data is recorded, the free space of the buffer memory 19 is monitored, and if the recording quality of the area just recorded can be checked (more specifically, if the quality check can be expected to end before the buffer memory 19 becomes full), recording is suspended and the asymmetry value or another signal quality value is detected (S4). This signal quality detection is performed by the signal quality detection circuit 16, which receives the output of the signal amplifying circuit 11.

If this detection process yields a decision that the signal quality is degraded and that a recording parameter such as, for example, the recording power must be altered (Yes in S5), a tilt adjustment is performed on the area just recorded (S6). When the tilt adjustment is performed, the asymmetry value or another value is also obtained (as a signal quality parameter) simultaneously (S6). Based on the obtained signal quality parameter, e.g., the asymmetry value, whether the signal quality is still degraded after the tilt adjustment is decided (S7). If the decision is that the signal quality is still degraded, the recording parameter, for example, the recording power, is altered (S8).

Whether there are still data to be recorded is now decided (S9): if there are no data to be recorded, recording is halted; if there are data to be recorded, recording resumes.

As noted above, the processing in steps S4 to S9 is performed during a suspension of recording on the optical disc 1.

In step S6, the tilt angle setting is stepped forward and backward around the present tilt angle (more specifically, the tilt value being used at present is taken as a center value and values obtained by increasing and decreasing the tilt angle value by one step (minimum increment) to several steps are used as tilt angle settings), and the signal amplitude is obtained at each tilt angle setting. The asymmetry value or another such value is obtained simultaneously as a recording quality check. The tilt angle that gives the maximum signal amplitude is set as the optimum tilt angle.

If the decision in steps S5 and S7 is that the signal quality is not degraded, whether to perform the next recording with the recording power already set is decided (S9): if there are no data to be recorded, recording is halted; if there are data to be recorded, recording resumes.

The decision as to whether signal quality is degraded in steps S5 and S7 is made in the signal quality detection means.

The tilt control process in step S6 is performed by the tilt control circuit 14 under the control of the CPU 22; the recording power adjustment in step S8 is performed by the optical head under the control of the CPU 22.

The decision as to whether there are still data to be recorded in step S9 is made by the CPU 22 based on information from the host controller 40.

The signal quality check (S4) and tilt adjustment (S6) described above are performed on the area recorded just before recording was suspended, but instead of being performed on the area recorded just before, these steps may be performed on any previously recorded area.

Second Embodiment

Figure 9:
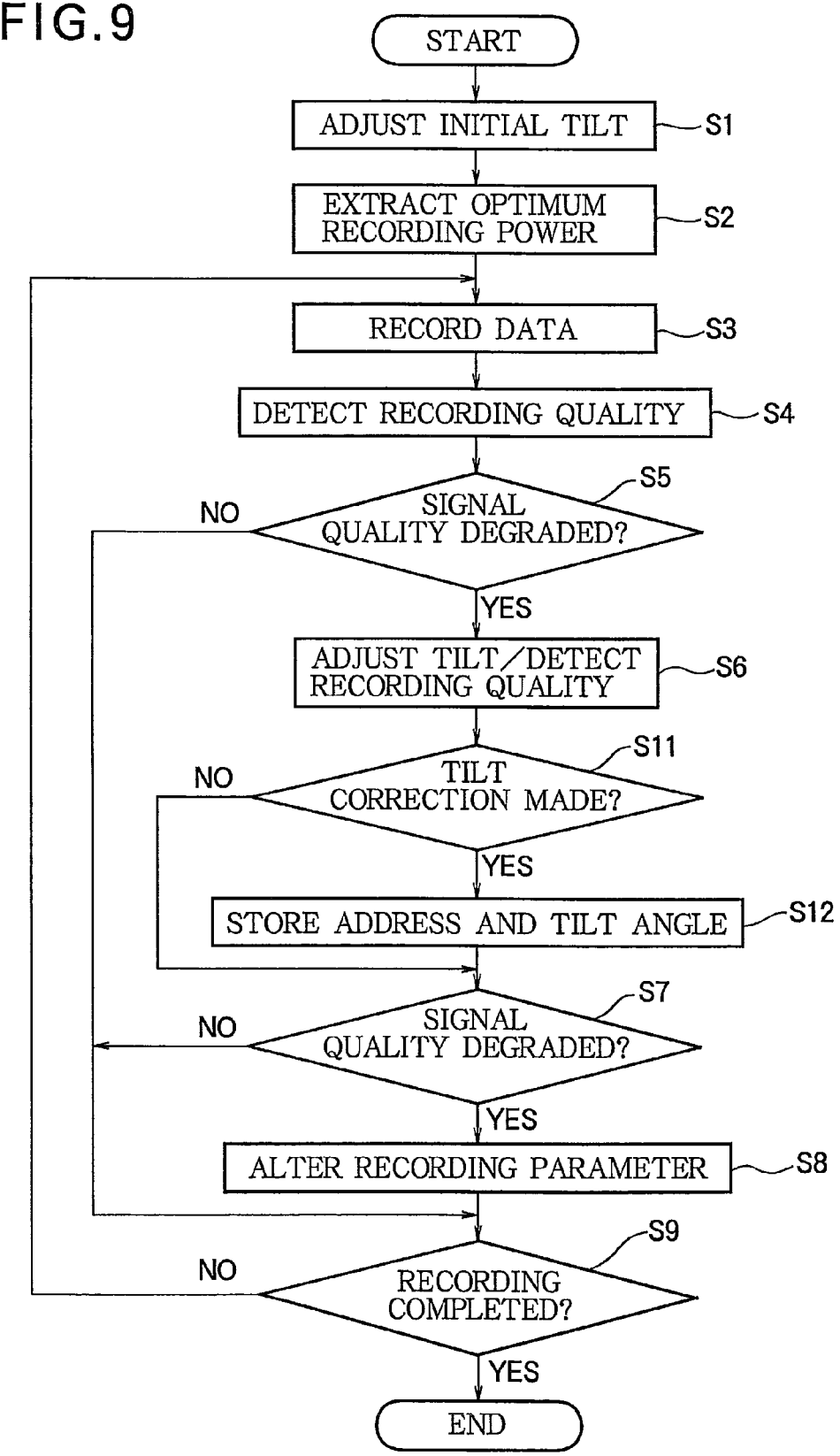
FIG. 9 is a flowchart illustrating an exemplary recording procedure in a second embodiment of the invention.

FIG. 9 is a flowchart illustrating the processing procedure in the recording method in the second embodiment of the invention. The recording method in the second embodiment is also carried out using the optical disc apparatus shown in FIG. 1.

The processing procedure in FIG. 9 is generally the same as the processing procedure in FIG. 8, but differs in that steps S11 and S12 are carried out after step S6.

In step S11, whether a tilt correction was made (the tilt was altered) in the tilt adjustment in step S6 is decided, and if there was a tilt correction, in step S12, the tilt angle and address information (position information) for the position (position on the disc) at which the tilt correction was performed are stored in, for example, the parameter memory 23b.

The address information may be radial position information. The stored information is stored in the form of a table giving tilt characteristic information for the optical disc 1.

The tilt characteristic information is stored in the parameter memory 23b of the optical disc apparatus 30 in combination with information identifying the optical disc 1, so after the disc is ejected, when it is inserted to write additional data, or reproduce data, tilt adjustment becomes unnecessary. Information prerecorded on the optical disc 1 (for example, information recorded during manufacturing) is read and stored in the parameter memory 23b as the information identifying the optical disc 1.

The processing in steps S11 and S12 is also performed under the control of the CPU 22 during a suspension of writing to the buffer memory 19.

In steps S2, S5, S7, and S8, as an example of a recording parameter, the recording power was determined, whether the recording power must be altered was decided, and the recording power was altered, but alternatively, the write strategy may be determined, whether the write strategy must be altered may be decided, and the write strategy may be altered, or the write strategy and recording power may both be determined, whether the write strategy and recording power must be altered may be decided, and both the write strategy and the recording power may be altered.

The asymmetry value is detected as the recording quality of the recorded area in step S4 in FIGS. 8 and 9, but instead of the asymmetry value, the modulation depth may be detected.

Tilt adjustment may also be performed on the basis of the jitter value or error rate.

Third Embodiment

Figure 10:
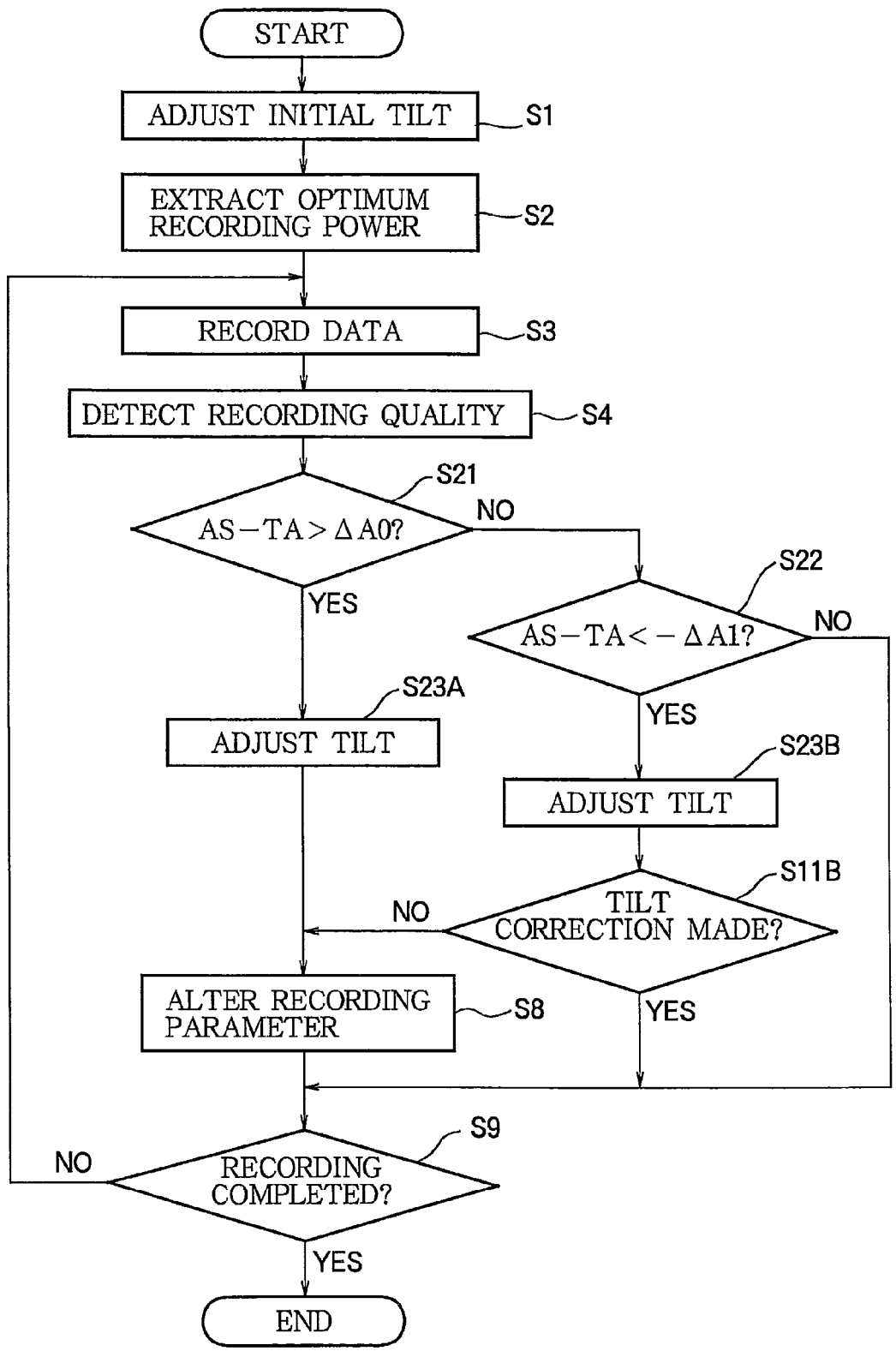
FIG. 10 is a flowchart illustrating an exemplary recording procedure in a third embodiment of the invention.

FIG. 10 is a flowchart illustrating the processing procedure in the recording method in the third embodiment of the invention. The recording method in the third embodiment is also carried out using the optical disc apparatus shown in FIG. 1.

The processing procedure in FIG. 10 is generally the same as the processing procedure in FIG. 8, but differs in that steps S21, S22, S23A, and S23B are carried out instead of steps S5 to S7, and also in that step S11B is added. Reference characters that are the same as in FIG. 8 designate steps that carry out similar processing. The processing in step S11B is identical in content to the processing in step S11 in FIG. 9. The processing in step S23A is identical in content to the processing in step S23B.

When a command to start recording is issued from the host controller 40, a tilt adjustment is performed at the recording start position (S1). The tilt adjustment is performed by the tilt control circuit 14 under the control of the CPU 22.

When the optical disc 1 is an unused blank disc, the tilt angle is set for maximum signal amplitude in the embossed area on the control tracks at the inner circumference position; when the optical disc 1 is not a blank disc, the tilt angle is set for maximum signal amplitude in a recorded area. If tilt angle information about the recorded area is retained as described below, the retained value may be set.

At the start of recording, the optimum recording power is determined in the power calibration area (S2), and data are recorded (S3). The CPU 22 determines the recording power, and the optical head 10 performs recording with the recording power determined by the CPU 22. The data recording is performed by the modulating/demodulating circuit 17 and the strategy generating circuit 21 under the control of the CPU 22. During recording, tracking control and focus control are also performed by the tracking control circuit 12 and the focus control circuit 13, based on the output from the signal amplifying circuit 11.

Next, a predetermined amount of data is recorded, the free space of the buffer memory 19 is monitored, and if the recording quality of the area just recorded can be checked (more specifically, if the quality check can be expected to end before the buffer memory 19 becomes full), recording is suspended and the asymmetry value or another signal quality value is detected (S4). This signal quality detection is performed by the signal quality detection circuit 16, which receives the output of the signal amplifying circuit 11.

In the third embodiment, as described in detail below, the processing differs according to the magnitude relationship between the asymmetry value AS obtained by reproducing the area recorded just before recording was suspended and a target asymmetry value TA that gives the optimum recording quality corresponding to the ID in the unique information of the optical disc.

When the asymmetry value AS obtained by reproducing the area recorded just before recording was suspended is greater than the target asymmetry value TA, and AS−TA>ΔA0 (ΔA0 being positive or zero), more specifically, when the absolute value (|AS−TA|) of the difference between the asymmetry value AS obtained by reproducing the area recorded just before recording was suspended and the target asymmetry value TA is greater than a prescribed value ΔA0 (ΔA0 being positive or zero), (in other words, the asymmetry value AS obtained by reproducing the area recorded just before recording was suspended exceeds the target asymmetry value TA by more than a prescribed amount) (Yes in S21), a tilt adjustment is performed (S23A), and a recording parameter, for example, the recording power, is altered (S8).

The recording power is altered in step S8, as above, after the tilt adjustment is performed in step S23A because the optimum value (±0°) of the tilt angle gives substantially the maximum asymmetry value, as shown in FIG. 7, and when the tilt angle is adjusted to the optimum value, the asymmetry value increases with increasing recording power, so if the asymmetry value AS obtained by reproducing the recorded area is greater than the target asymmetry value TA, the recording power may have been higher than the optimum value.

When the difference between the asymmetry value AS obtained by reproducing the area recorded just before recording was suspended and the target asymmetry value TA satisfies AS−TA≤ΔA0, more specifically, when the absolute value (|AS−TA|) of the difference between the asymmetry value AS obtained by reproducing the area recorded just before recording was suspended and the target asymmetry value TA is equal to or less than the prescribed value ΔA0 (ΔA0 being positive or zero) (No in S21), the processing procedure proceeds to step S22, and now if the asymmetry value AS obtained by reproducing the area recorded just before recording was suspended is less than the target asymmetry value TA and AS−TA<−ΔA1 (ΔA1 being positive or zero), more specifically, if the absolute value (|AS−TA|) of the difference between the asymmetry value AS obtained by reproducing the area recorded just before recording was suspended and the target asymmetry value TA is greater than a prescribed value ΔA1 (ΔA1 being positive or zero), (in other words, the asymmetry value AS obtained by reproducing the area recorded just before recording was suspended is less than the target asymmetry value TA by more than a prescribed amount) (Yes in S22), a tilt adjustment is performed (S23B), whether a tilt correction was made (the tilt was altered) is decided (S11B), and if there was a tilt correction (Yes in S11B), whether there are still data to be recorded is decided (S9): if there are no data to be recorded, recording is halted; if there are data to be recorded, recording resumes.

If there was no tilt correction (No in S11B), a recording parameter, for example, the recording power, is altered (S8), and whether there are still data to be recorded is decided (S9): if there are no data to be recorded, recording is halted; if there are data to be recorded, recording resumes.

Figure 11:
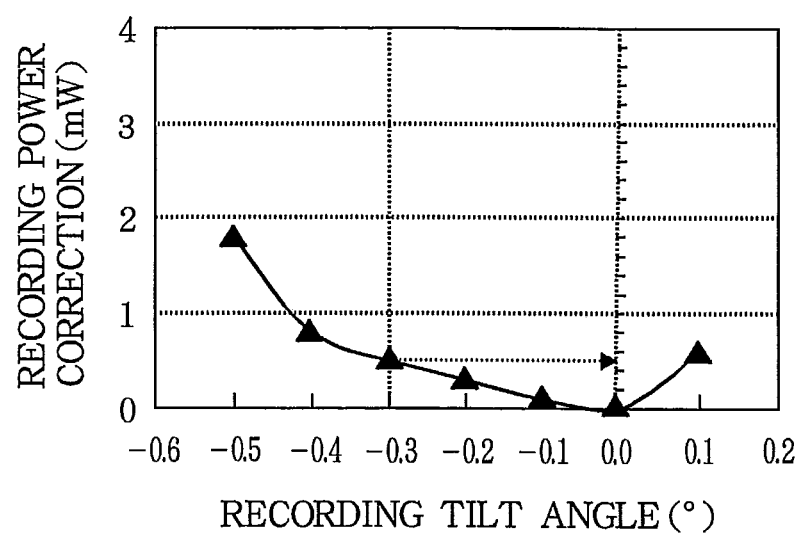
FIG. 11 illustrates the relationship between recording tilt angle and recording power correction.

When the tilt angle departs from the optimum value (±0°) as shown in FIG. 11, if the recording power is fixed and the tilt angle is adjusted to the optimum value, the asymmetry value may increase, and therefore, when a tilt correction has been performed, the asymmetry value increases even if the recording power is adjusted, while when the tilt correction has not been performed, the recording power must be altered, so whether to alter the recording power in step S8 is decided according to whether there was a tilt correction in step S11B.

When the difference (AS−TA) between the asymmetry value AS obtained by reproducing the area recorded just before recording was suspended and the target asymmetry value TA satisfies AS−TA≥−ΔA1, more specifically, when the absolute value (|AS−TA|) of the difference between the asymmetry value AS obtained by reproducing the area recorded just before recording was suspended and the target asymmetry value TA is equal to or less than the prescribed value ΔA1 (ΔA1 being positive or zero) (No in S22), that implies, in combination with the decision in step S21, that TA−ΔA1≤AS≤TA+ΔA0, and the difference between the asymmetry value AS obtained by reproducing the recorded area is equal to the target asymmetry value TA is nil, or is within the range of a certain value, so the recording parameter is not altered, and subsequent processing continues.

The prescribed values A0 and A1 may be equal, or may differ.

Fourth Embodiment

Figure 12:
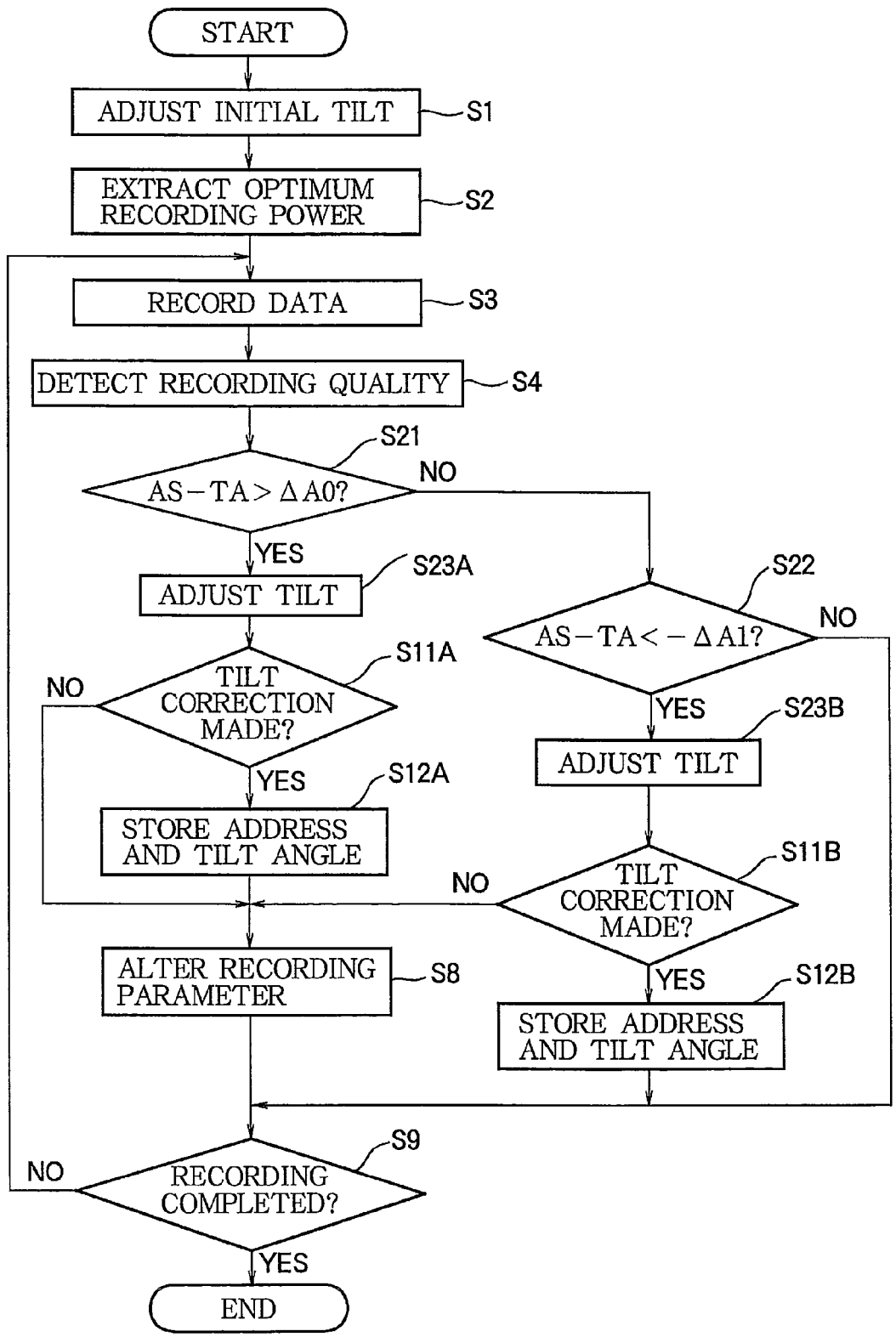
FIG. 12 is a flowchart illustrating an exemplary recording procedure in a fourth embodiment of the invention.

FIG. 12 is a flowchart illustrating the procedure of the recording method in the fourth embodiment of the invention. The recording method in the fourth embodiment also involves the use of the optical disc apparatus shown in FIG. 1.

The processing procedure in FIG. 12 is generally the same as the processing procedure in FIG. 10, but differs in that the processing in steps S11A and S12A is carried out after step S23A, and the processing in step S12B is carried out after step S11B. The processing in steps S11A and S11B is identical in content to the processing in step S11 in FIG. 8, and the processing in steps S12A and S12B is identical in content to the processing in step S12 in FIG. 8.

Whether a tilt correction was made (the tilt was altered) in the tilt adjustment in step S23A is decided (S11A), and if there was a tilt correction (Yes in S11A), in step S12A, the tilt angle and address information (position information) for the position (position on the disc) at which the tilt correction was performed are stored in, for example, the parameter memory 23b. Similarly, whether a tilt correction was made (the tilt was altered) in the tilt adjustment in step S23B is decided (S11B), and if there was a tilt correction (Yes in S11B), in step S12B, the tilt angle and address information (position information) for the position (position on the disc) at which the tilt correction was performed are stored in, for example, the parameter memory 23b.

The address information may be radial position information. The stored information is stored in the form of a table giving tilt characteristic information for the optical disc 1.

The tilt characteristic information is stored in the parameter memory 23b of the optical disc apparatus 30 in combination with information identifying the optical disc 1, so after the disc is ejected, when it is inserted to write additional data, or reproduce data, tilt adjustment becomes unnecessary. Information prerecorded on the optical disc 1 (for example, information recorded during manufacturing) is read and stored in the parameter memory 23b as the information identifying the optical disc 1.

The processing in steps S11A, S11B, S12A, and S12B is also performed under the control of the CPU 22.

Fifth Embodiment

Figure 13:
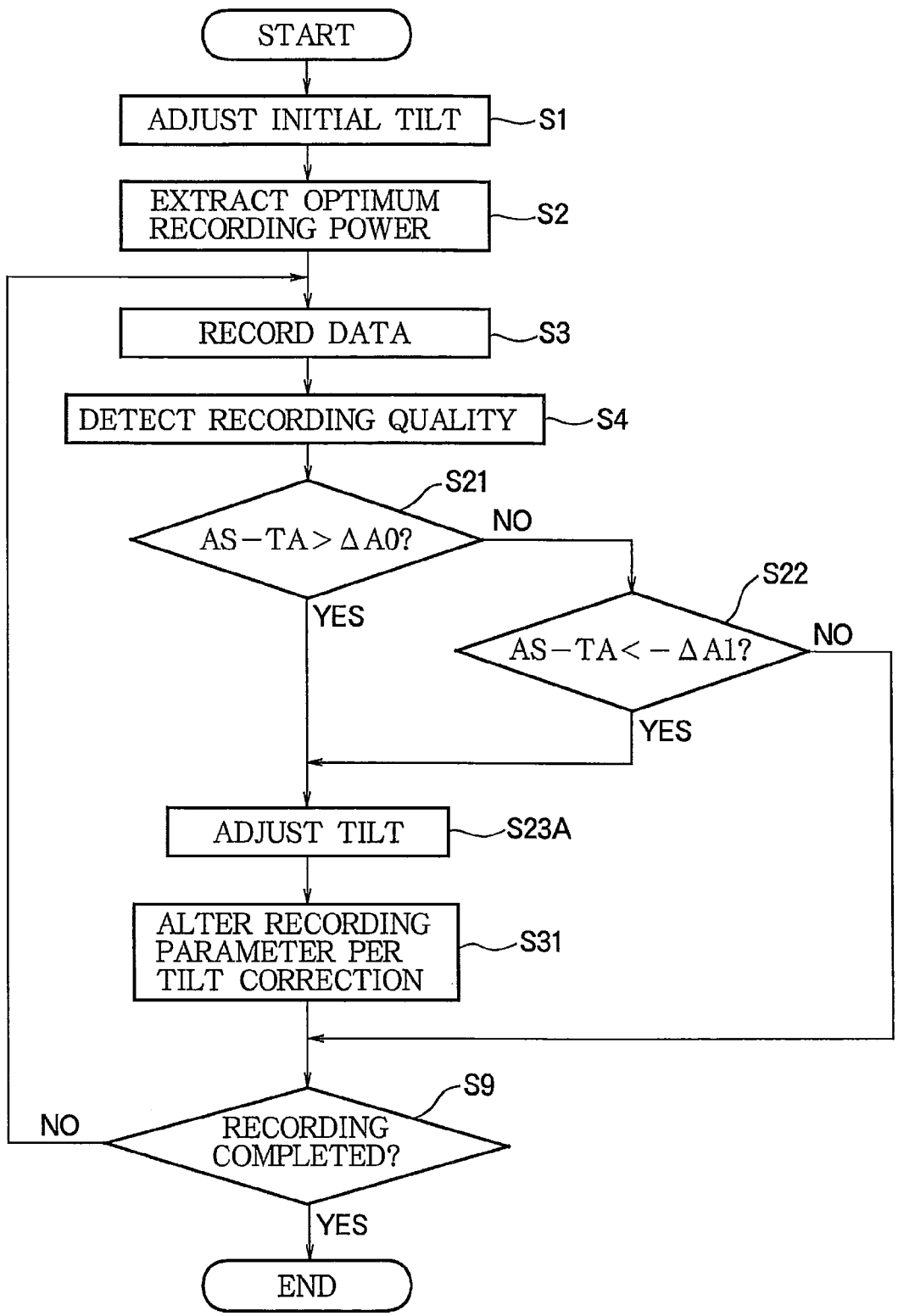
FIG. 13 is a flowchart illustrating an exemplary recording procedure in a fifth embodiment of the invention.

FIG. 13 is a flowchart illustrating the procedure of the recording method in the fifth embodiment of the invention. The recording method in the fifth embodiment also involves the use of the optical disc apparatus shown in FIG. 1.

When recording quality degradation is recognized in steps S21 and S22 in FIG. 10 (Yes in S21 or Yes in S22), the processing procedure in FIG. 13 makes a recording parameter change inclusive of the amount of tilt correction due to the tilt adjustment and the difference (AS−TA) between the asymmetry value AS obtained by reproducing the area recorded just before recording was suspended and the target asymmetry value TA at which the recording quality becomes optimal, corresponding to the ID of the unique information of the optical disc.

When a command to start recording is issued from the host controller 40, a tilt adjustment is performed at the recording start position (S1). The tilt adjustment is performed by the tilt control circuit 14 under the control of the CPU 22.

When the optical disc 1 is an unused blank disc, the tilt angle is set for maximum signal amplitude in the embossed area on the control tracks at the inner circumference position; when the optical disc 1 is not a blank disc, the tilt angle is set for maximum signal amplitude in a recorded area. If tilt angle information about the recorded area is retained as described below, the retained value may be set.

At the start of recording, the optimum recording power is determined in the power calibration area (S2), and data are recorded (S3). The CPU 22 determines the recording power, and the optical head 10 performs recording with the recording power determined by the CPU 22. The data recording is performed by the modulating/demodulating circuit 17 and the strategy generating circuit 21 under the control of the CPU 22. During recording, tracking control and focus control are also performed by the tracking control circuit 12 and the focus control circuit 13, based on the output from the signal amplifying circuit 11.

Next, a predetermined amount of data is recorded, the free space of the buffer memory 19 is monitored, and if the recording quality of the area just recorded can be checked (more specifically, if the quality check can be expected to end before the buffer memory 19 becomes full), recording is suspended and the asymmetry value or another signal quality value is detected (S4). This signal quality detection is performed by the signal quality detection circuit 16, which receives the output of the signal amplifying circuit 11.

When the difference (AS−TA) between the asymmetry value AS obtained by reproducing the area recorded just before recording was suspended and the target asymmetry value TA satisfies AS−TA>ΔA0 (ΔA0 being positive or zero) (Yes in S21), and also when the difference (AS−TA) satisfies AS−TA<−ΔA1 (ΔA1 being positive or zero) (Yes in S22), a tilt adjustment is performed (S23A), and a recording parameter, for example, the recording power, is altered (S31).

In step S31, however, the recording power is altered according to the relationship between the recording tilt angle and recording power correction shown in FIG. 11.

If, for example, a tilt angle deviation of −0.3° from the optimum value was detected in the tilt adjustment, the asymmetry value obtained by performing the tilt correction is equivalent to the asymmetry value that would be obtained when recording is performed with the value of the recording power decreased by 0.5 mW. Therefore, if the recording power remains identical before and after the tilt correction, at the optimum tilt value, an asymmetry value equal to the value obtained with a 0.5 mW higher recording power is obtained.

The relationship between the recording power and the asymmetry value and the relationship between the recording tilt angle and the recording power correction shown in FIG. 11 may be stored in, for example, the parameter memory 23b in FIG. 1 in the form of a table, or may be stored in the program memory 23a as a conversion formula relating the recording tilt angle and the recording power correction and a program for performing the computation in the conversion formula.

Sixth Embodiment

Figure 14:
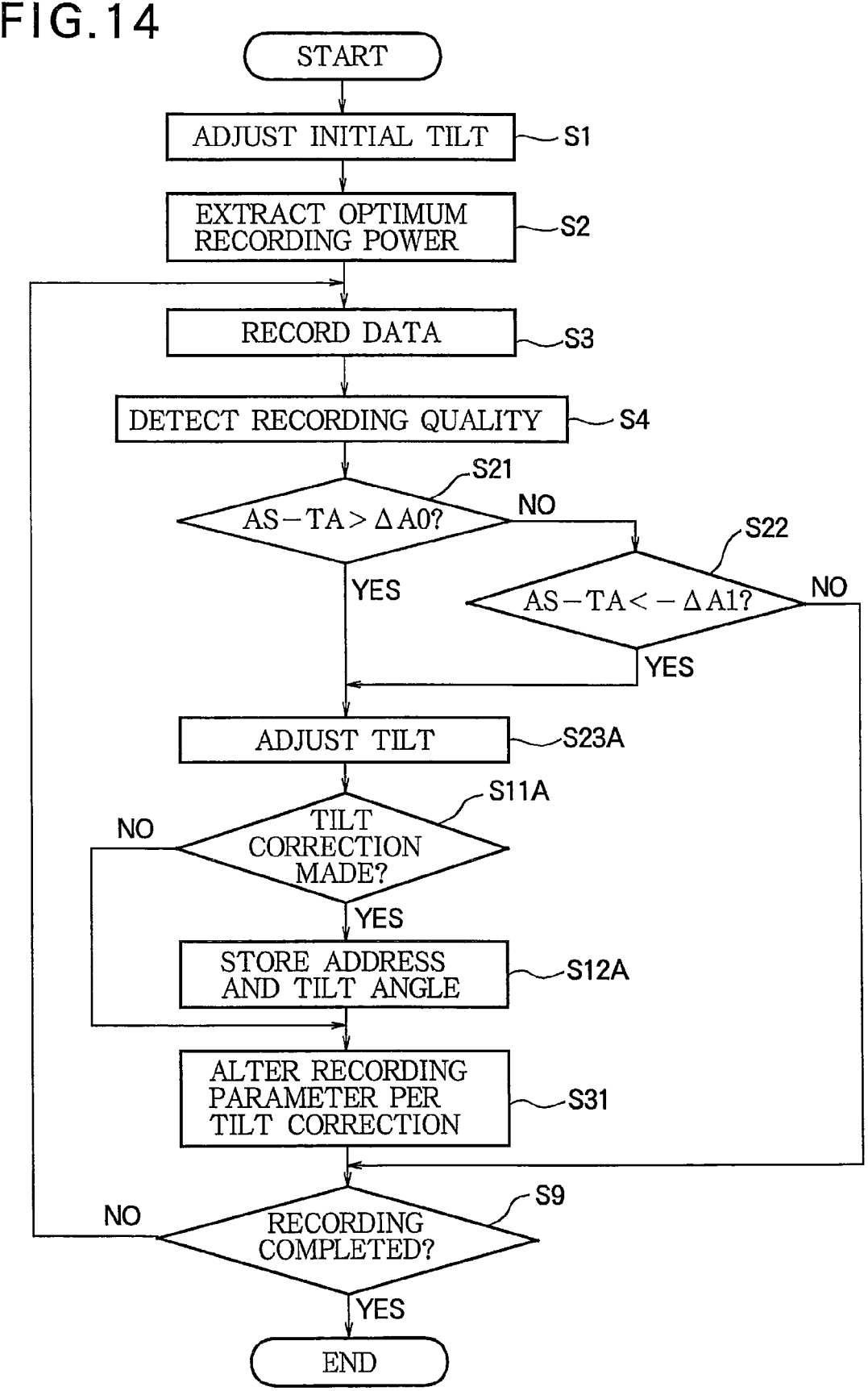
FIG. 14 is a flowchart illustrating an exemplary recording procedure in a sixth embodiment of the invention.

FIG. 14 is a flowchart illustrating the procedure of the recording method in the sixth embodiment of the invention. The recording method in the sixth embodiment also involves the use of the optical disc apparatus shown in FIG. 1.

The processing procedure in FIG. 14 is generally the same as the processing procedure in FIG. 13, but differs in that the processing in steps S11A and S12A is carried out after step S23A. The processing in steps S11A and S12A is identical in content to the processing in steps S11 and S12, respectively, in FIG. 8.

Whether a tilt correction was made (the tilt was altered) in the tilt adjustment in step S23A is decided (S11A), and if there was a tilt correction (Yes in S11A), in step S12A, the tilt angle and address information (position information) for the position (position on the disc) at which the tilt correction was performed are stored in, for example, the parameter memory 23b. The address information may be radial position information. The stored information is stored in the form of a table giving tilt characteristic information for the optical disc 1.

The tilt characteristic information is stored in the parameter memory 23b of the optical disc apparatus 30 in combination with information identifying the optical disc 1, so after the disc is ejected, when it is inserted to write additional data, or reproduce data, tilt adjustment becomes unnecessary. Information prerecorded on the optical disc 1 (for example, information recorded during manufacturing) is read and stored in the parameter memory 23b as the information identifying the optical disc 1.

The processing in steps S11A and S12A is also performed under the control of the CPU 22.

In steps S2, S8, and S31 in FIG. 10 and FIGS. 12 to 14, as an example of a recording parameter, the recording power was determined and altered, but alternatively, the write strategy may be determined and altered, or both the write strategy and recording power may be determined and altered.

In steps S4, S21, and S22 in FIGS. 10 to 13 the asymmetry value is detected as the recording signal quality of a recorded area and a decision is made according to the asymmetry value, but instead of the asymmetry value, modulation depth may be detected and a decision may be made according to the asymmetry value.

Tilt adjustment may also be performed based on a jitter value or an error rate.

Signal quality detection (step S4 in FIGS. 9, 10, 12, 13, and 14) and tilt adjustment (step S6 in FIG. 9, steps S23A and S23B in FIGS. 10, 12, 13, and 14) in the second to sixth embodiments are not limited to being performed on the area recorded just before recording was suspended; as noted in the first embodiment, these steps may be performed on any previously recorded area.

What is claimed is:

1. An optical disc apparatus comprising:
    an optical head for emitting a laser beam for recording and reproducing, receiving reflected light due to reflection of the laser beam from a recording medium surface of an optical disc, and outputting an electrical signal corresponding to the received light;
    a signal amplifying unit configured to amplify the signal, derived from the reflected light, from the optical head and output a servo error signal and a reproduced signal;
    a focus control unit configured to perform a focusing point search operation by moving a focusing unit of the optical head in a direction substantially perpendicular to the recording medium surface of the optical disc until the laser beam is focused on the recording medium surface of the optical disc, and keep the focusing unit in the focused state;
    a tilt control unit configured to perform an adjustment to make the laser beam focused by the focusing unit perpendicular to the recording medium surface of the optical disc;
    a signal quality detection unit configured to detect a signal quality of the reproduced signal output from the signal amplifying unit;
    a modulating/demodulating unit configured to perform modulation and demodulation according to a modulation rule used on the recording medium surface of the optical disc;
    an interface unit configured to perform data communication with a host controller;
    a buffer memory for temporarily holding recording data supplied from the controller via the interface unit; and
    a control unit configured to reproduce a recorded area during a suspension of a recording operation, and when degradation of the recorded signal is detected by the signal quality detection unit, perform a tilt adjustment on the recorded area by use of the tilt control unit and detect a signal quality of the recorded signal after the tilt adjustment by use of the signal quality detection unit, and alter a recording parameter when the signal quality detection unit finds that the recorded signal is still degraded even after the tilt adjustment, and no tilt correction occurred in the tilt adjustment.

2. An optical disc apparatus comprising:

an optical head for emitting a laser beam for recording and reproducing and receiving reflected light due to reflection of the laser beam from a recording medium surface of an optical disc;

a signal amplifying unit configured to amplify and convert a signal, derived from the reflected light, from the optical head to a servo error signal and a reproduced signal;

a focus control unit configured to perform a focusing point search operation by moving a focusing unit of the optical head in a direction substantially perpendicular to the recording medium surface of the optical disc until the laser beam is focused on the recording medium surface of the optical disc, and keep the focusing unit in the focused state;

a tilt control unit configured to perform an adjustment to make the laser beam focused by the focusing unit perpendicular to the recording medium surface of the optical disc;

a signal quality detection unit configured to detect a signal quality of the reproduced signal output from the signal amplifying unit;

a modulating/demodulating unit configured to perform modulation and demodulation according to a modulation rule used on the recording medium surface of the optical disc;

an interface unit configured to perform data communication with a host controller;

a buffer memory for temporarily holding recording data supplied from the controller via the interface unit; and a control unit configured to reproduce a recorded area during a suspension of a recording operation, perform a tilt adjustment by use of the tilt control unit when degradation of the recorded signal is detected by the signal quality detection unit, and when a tilt correction occurs, store information on a position at which the tilt correction occurred, tilt-angle information, and information identifying the optical disc from the reproduced signal, and alter a recording parameter when the signal quality detection unit finds that the recorded signal is still degraded even after the tilt adjustment, and no tilt correction occurred in the tilt adjustment.

3. The optical disc apparatus of claim 1, wherein the degradation of the recorded signal is degradation of an asymmetry value.

4. The optical disc apparatus of claim 1, wherein the degradation of the recorded signal is degradation of a modulation depth.

5. The optical disc apparatus of claim 1, wherein the recording parameter is a recording power.

6. The optical disc apparatus of claim 1, wherein the recording parameter is a write strategy.

7. The optical disc apparatus of claim 1, wherein the recording parameter includes a write strategy and a recording power.

8. A recording method for an optical disc apparatus comprising:

an optical head for emitting a laser beam for recording and reproducing, receiving reflected light due to reflection of the laser beam from a recording medium surface of an optical disc, and outputting an electrical signal corresponding to the received light;

a signal amplifying step for amplifying the signal, derived from the reflected light, from the optical head and outputting a servo error signal and a reproduced signal;

a focus control step for performing a focusing point search operation by moving a focusing unit of the optical head in a direction substantially perpendicular to the recording medium surface of the optical disc until the laser beam is focused on the recording medium surface of the optical disc, and keeping the focusing unit in the focused state;

a tilt control step for performing an adjustment to make the laser beam focused by the focusing unit perpendicular to the recording medium surface of the optical disc;

a signal quality detection step for detecting a signal quality of the reproduced signal output from the signal amplifying step;

a modulating/demodulating step for performing modulation and demodulation according to a modulation rule used on the recording medium surface of the optical disc; and a holding step for temporarily holding recording data supplied from the host controller; wherein when a recorded area is reproduced during a suspension of a recording operation and degradation of the recorded signal is detected by the signal quality detection step, a tilt adjustment is performed on the recorded area by the tilt control step and the signal quality of the recorded signal after the tilt adjustment is detected by the signal quality detection step, and a recording parameter is altered when the signal quality detection step finds that the recorded signal is still degraded even after the tilt adjustment, and no tilt correction occurred in the tilt adjustment.

9. A recording method for an optical disc apparatus comprising:

a step of emitting a laser beam for recording and reproducing and receiving reflected light due to reflection of the laser beam from a recording medium surface of an optical disc, by use of an optical head;

a signal amplifying step for amplifying and converting a signal, derived from the reflected light, from the optical head to a servo error signal and a reproduced signal;

a focus control step for performing a focusing point search operation by moving a focusing unit of the optical head in a direction substantially perpendicular to the recording medium surface of the optical disc until the laser beam is focused on the recording medium surface of the optical disc, and keeping the focusing unit in the focused state;

a tilt control step for performing an adjustment to make the laser beam focused by the focusing unit perpendicular to the recording medium surface of the optical disc;

a signal quality detection step for detecting a signal quality of the reproduced signal output from the signal amplifying step;

a modulating/demodulating step for performing modulation and demodulation according to a modulation rule used on the recording medium surface of the optical disc; and a holding step for temporarily holding recording data supplied from the controller; wherein a recorded area is reproduced during a suspension of a recording operation; and a tilt adjustment is performed by the tilt control step when degradation of the recorded signal is detected by the signal quality detection step, and when a tilt correction occurs, information on a position at which the tilt correction occurred, tilt-angle information, and information identifying the optical disc from the reproduced signal is stored, and a recording parameter is altered when the signal quality detection step finds that the recorded signal is still degraded even after the tilt adjustment, and no tilt correction occurred in the tilt adjustment.

10. The recording method for an optical disc of claim 8, wherein the degradation of the recorded signal is degradation of an asymmetry value.

11. The recording method for an optical disc of claim 8, wherein the degradation of the recorded signal is degradation of a modulation depth.

12. The recording method for an optical disc of claim 8, wherein the recording parameter is a recording power.

13. The recording method for an optical disc of claim 8, wherein the recording parameter is a write strategy.

14. The recording method for an optical disc of claim 8, wherein the recording parameter includes a write strategy and a recording power.

15. An optical disc apparatus comprising:
an optical head for emitting a laser beam for recording and reproducing, receiving reflected light due to reflection of the laser beam from a recording medium surface of an optical disc, and outputting an electrical signal corresponding to the received light;
a signal amplifying unit configured to amplify the signal, derived from the reflected light, from the optical head and output a servo error signal and a reproduced signal;
a focus control unit configured to perform a focusing point search operation by moving a focusing unit of the optical head in a direction substantially perpendicular to the recording medium surface of the optical disc until the laser beam is focused on the recording medium surface of the optical disc, and keep the focusing unit in the focused state;
a tilt control unit configured to perform an adjustment to make the laser beam focused by the focusing unit perpendicular to the recording medium surface of the optical disc;
a signal quality detection unit configured to detect a signal quality of the reproduced signal output from the signal amplifying unit;
a modulating/demodulating unit configured to perform modulation and demodulation according to a modulation rule used on the recording medium surface of the optical disc;
an interface unit configured to perform data communication with a host controller;
a buffer memory for temporarily holding recording data supplied from the controller via the interface unit; and
a control unit configured to reproduce a recorded area during a suspension of a recording operation, and perform a tilt adjustment on the recorded area by use of the tilt control unit when an absolute value of a difference between the recorded signal quality obtained by the signal quality detection unit and a target value of the recorded signal quality exceeds a prescribed value, and alter a recording parameter when the signal quality detection unit finds that the recorded signal is still degraded even after the tilt adjustment, and no tilt correction occurred in the tilt adjustment.

16. An optical disc apparatus comprising:
an optical head for emitting a laser beam for recording and reproducing and receiving reflected light due to reflection of the laser beam from a recording medium surface of an optical disc;
a signal amplifying unit configured to amplify and convert a signal, derived from the reflected light, from the optical head to a servo error signal and a reproduced signal;
a focus control unit configured to perform a focusing point search operation by moving a focusing unit of the optical head in a direction substantially perpendicular to the recording medium surface of the optical disc until the laser beam is focused on the recording medium surface of the optical disc, and keep the focusing unit in the focused state;
a tilt control unit configured to perform an adjustment to make the laser beam focused by the focusing unit perpendicular to the recording medium surface of the optical disc;
a signal quality detection unit configured to detect a signal quality of the reproduced signal output from the signal amplifying unit;
a modulating/demodulating unit configured to perform modulation and demodulation according to a modulation rule used on the recording medium surface of the optical disc;
an interface unit configured to perform data communication with a host controller;
a buffer memory for temporarily holding recording data supplied from the controller via the interface unit; and
a control unit configured to reproduce a recorded area during a suspension of a recording operation, perform a tilt adjustment on the recorded area by use of the tilt control unit when an absolute value of a difference between the recorded signal quality obtained by the signal quality detection unit and a target value of the recorded signal quality exceeds a prescribed value, and when a tilt correction occurs, store information on a position at which the tilt correction occurred, tilt-angle information, and optical disc identifying information from the reproduced signal, and alter a recording parameter when the signal quality detection unit finds that the recorded signal is still degraded even after the tilt adjustment, and no tilt correction occurred in the tilt adjustment.

17. The optical disc apparatus of claim 15, wherein an asymmetry value is used as an index of the recorded signal quality.

18. The optical disc apparatus of claim 15, wherein a modulation depth is used as an index of the recorded signal quality.

19. The optical disc apparatus of claim 15, wherein the recording parameter is a recording power.

20. The optical disc apparatus of claim 15, wherein the recording parameter is a write strategy.

21. The optical disc apparatus of claim 15, wherein the recording parameter includes a write strategy and a recording power.

22. A recording method for an optical disc apparatus, comprising:
a step of emitting a laser beam for recording and reproducing, receiving reflected light due to reflection of the laser beam from a recording medium surface of an optical disc, and outputting an electrical signal corresponding to the received light, using an optical head;

a signal amplifying step for amplifying the signal, derived from the reflected light, from the optical head and outputting a servo error signal and a reproduced signal;

a focus control step for performing a focusing point search operation by moving a focusing unit of the optical head in a direction substantially perpendicular to the recording medium surface of the optical disc until the laser beam is focused on the recording medium surface of the optical disc, and keeping the focusing unit in the focused state;

a tilt control step for performing an adjustment to make the laser beam focused by the focusing unit perpendicular to the recording medium surface of the optical disc;

a signal quality detection step for detecting a signal quality of the reproduced signal output by the signal amplifying step;

a modulating/demodulating step for performing modulation and demodulation according to a modulation rule used on the recording medium surface of the optical disc; and a holding step for temporarily holding recording data supplied from the controller; wherein a recorded area is reproduced during a suspension of a recording operation, and when an absolute value of a difference between a recorded signal quality obtained in the signal quality detection step and a target value of the recorded signal quality exceeds a prescribed value, a tilt adjustment is performed on the recorded area by the tilt control step, and a recording parameter is altered when the signal quality detection step finds that the recorded signal is still degraded even after the tilt adjustment, and no tilt correction occurred in the tilt adjustment.

23. A recording method for an optical disc apparatus comprising:

an optical head for emitting a laser beam for recording and reproducing, receiving reflected light due to reflection of the laser beam from a recording medium surface of an optical disc, and outputting an electrical signal corresponding to the received light;

a signal amplifying step for amplifying the signal, derived from the reflected light, from the optical head and outputting a servo error signal and a reproduced signal;

a focus control step for performing a focusing point search operation by moving a focusing unit of the optical head in a direction substantially perpendicular to the recording medium surface of the optical disc until the laser beam is focused on the recording medium surface of the optical disc, and keeping the focusing unit in the focused state;

a tilt control step for performing an adjustment to make the laser beam focused by the focusing unit perpendicular to the recording medium surface of the optical disc;

a signal quality detection step for detecting a signal quality of the reproduced signal output from the signal amplifying step;

a modulating/demodulating step for performing modulation and demodulation according to a modulation rule used on the recording medium surface of the optical disc;

a holding step for temporarily holding recording data supplied from the controller; wherein a recorded area is reproduced during suspension of a recording operation, a tilt adjustment is performed on the recorded area in the tilt control step when an absolute value of a difference between a recorded signal quality obtained in the signal quality detection step and a target value of the recorded signal quality exceeds a prescribed value, and when a tilt correction occurs, information on the position at which the tilt correction occurred, tilt angle information, and optical disc identifying information from the reproduced signal are stored, and a recording parameter is altered when the signal quality detection step finds that the recorded signal is still degraded even after the tilt adjustment, and no tilt correction occurred in the tilt adjustment.

24. The recording method for an optical disc apparatus of claim 22, wherein an asymmetry value is used as an index of the recorded signal quality.

25. The recording method for an optical disc apparatus of claim 22, wherein a modulation depth is used as an index of the recorded signal quality.

26. The recording method for an optical disc apparatus of claim 22, wherein the recording parameter is a recording power.

27. The recording method for an optical disc apparatus of claim 22, wherein the recording parameter is a write strategy.

28. The recording method for an optical disc apparatus of claim 22, wherein the recording parameter includes a write strategy and a recording power.

* * * * *